United States Patent
Nagamori et al.

(10) Patent No.: US 8,742,006 B2
(45) Date of Patent: Jun. 3, 2014

(54) CROSS-LINKABLE NITRILE RUBBER COMPOSITION AND CROSS-LINKED RUBBER

(75) Inventors: Hiroyasu Nagamori, Kawagoe (JP); Shigeru Fujita, Yokohama (JP)

(73) Assignee: Zeon Corporation, Tokyo (JP)

( * ) Notice: Subject to any disclaimer, the term of this patent is extended or adjusted under 35 U.S.C. 154(b) by 593 days.

(21) Appl. No.: 12/226,355

(22) PCT Filed: Apr. 16, 2007

(86) PCT No.: PCT/JP2007/058257
§ 371 (c)(1),
(2), (4) Date: Oct. 16, 2008

(87) PCT Pub. No.: WO2007/119848
PCT Pub. Date: Oct. 25, 2007

(65) Prior Publication Data
US 2009/0186977 A1  Jul. 23, 2009

(30) Foreign Application Priority Data

Apr. 17, 2006  (JP) ................................ 2006-113008
Jun. 14, 2006  (JP) ................................ 2006-164409

(51) Int. Cl.
*C08K 3/36*  (2006.01)
*C08L 9/02*  (2006.01)
*C08L 13/00*  (2006.01)

(52) U.S. Cl.
CPC ... *C08L 9/02* (2013.01); *C08K 3/36* (2013.01); *C08L 13/00* (2013.01); *C09K 2200/0247* (2013.01); *C09K 2200/0612* (2013.01)
USPC ........... 524/565; 524/556; 524/791; 525/379; 525/329.1; 525/329.6

(58) Field of Classification Search
CPC .. C08K 3/36; C08K 2200/0612; C08L 13/00; C08L 9/02; C09K 2200/0247
USPC ............... 524/556, 565, 791; 525/379, 329.1, 525/329.6
See application file for complete search history.

(56) References Cited

U.S. PATENT DOCUMENTS

| | | | |
|---|---|---|---|
| 5,057,566 A | * | 10/1991 | Kobayashi et al. ........... 524/297 |
| 2003/0096904 A1 | * | 5/2003 | Hakuta et al. ................. 524/588 |
| 2003/0166789 A1 | * | 9/2003 | Aimura et al. ............. 525/329.1 |
| 2004/0110888 A1 | * | 6/2004 | Guerin et al. ................. 524/492 |

FOREIGN PATENT DOCUMENTS

| | | | |
|---|---|---|---|
| EP | 0 558 385 A1 | 9/1993 | |
| EP | 1 277 796 A1 | 1/2003 | |
| EP | 1 591 481 A1 | 11/2005 | |
| GB | 2 084 602 A | 4/1982 | |
| JP | 62-240338 A | 10/1987 | |
| JP | 9-003246 A | 1/1997 | |
| JP | 2001-055471 A | 2/2001 | |
| JP | 2001055471 A | * 2/2001 | ............... C08L 9/02 |
| JP | 2001-115005 A | 4/2001 | |
| JP | 2002-194202 A | 7/2002 | |
| JP | 2004-250645 A | 9/2004 | |
| WO | WO 2004/035670 A1 | 4/2004 | |

OTHER PUBLICATIONS

Susmita Bhattacharjee et al, Ind. Eng. Chem. Res. 1991, 30, 1086-1092.*
George Wypych, Handbook of Fillers, $2^{nd}$ Edition, 2000.*
JP 2001-055471A; Mori et al; Machine Translation; Feb. 2001.*
Extended European Search Report dated Jun. 17, 2010 relating to corresponding EP 07741693.1.

* cited by examiner

*Primary Examiner* — Mark Kaucher
(74) *Attorney, Agent, or Firm* — Birch, Stewart, Kolasch & Birch, LLP

(57) ABSTRACT

A cross-linkable nitrile rubber composition comprising a nitrile rubber (A1) including an α,β-ethylenically unsaturated nitrile monomer unit and having iodine value of 120 or less, silica (B1) having CaO value determined by X-ray fluorescence composition analysis of 0.5 wt % or more, and a crosslinking agent (C1). According to the present invention, a cross-linkable nitrile rubber composition, capable of giving a highly-saturated cross-linked nitrile rubber having excellent mechanical properties such as elongation and small compression set, and excellent in workability, and a cross-linked rubber obtained by crosslinking the rubber composition can be provided.

12 Claims, No Drawings

CROSS-LINKABLE NITRILE RUBBER COMPOSITION AND CROSS-LINKED RUBBER

FIELD OF THE INVENTION

The present invention relates to a cross-linkable nitrile rubber composition capable of giving a highly-saturated cross-linked nitrile rubber having excellent mechanical properties such as elongation and small compression set, and excellent in workability, and a cross-linked rubber.

DESCRIPTION OF THE RELATED ART

As a rubber having excellent oil resistance, heat resistance and ozone resistance, a nitrile group containing highly-saturated copolymer rubber (i.e. "highly-saturated nitrile rubber" including hydrogenated nitrile rubber) has been known, and the cross-linked rubber thereof has been used as materials for various automotive rubber products such as a belt, hose, gasket, packing and oil-seal. Recently, required qualities of these material rubbers have been further growing, and particularly in a bulk rubber product other than a fiber impregnated body or metal composite body, it has been required to further improve compression set as well as mechanical properties such as elongation.

In response to this, Patent Article 1 proposes a cross-linked rubber obtained by blending white carbon (silica) into a highly-saturated nitrile rubber and vulcanizing therewith an organic peroxide. However, the obtained cross-linked rubber is excellent in heat resistance but insufficient in improvement of compression set.

Also, Patent Article 2 proposes a cross-linkable rubber composition comprising a highly-saturated nitrile rubber including an α,β-ethylenically unsaturated dicarboxylic acid monoalkyl ester monomer unit, a polyamine-based crosslinking agent and a basic crosslinking accelerator. The composition shows slight improvements in tensile strength and compression set, which are not enough, so that it has been required to further improve compression set.

Patent Article 1: The Japanese Unexamined Patent Publication H9-3246;

Patent Article 2: The Japanese Unexamined Patent Publication 2001-55471.

DISCLOSURE OF INVENTION

Problem to be Solved by the Invention

An object of the present invention is to provide a cross-linkable nitrile rubber composition capable of giving a highly-saturated cross-linked nitrile rubber having excellent mechanical properties such as elongation and small compression set, and excellent in workability, and a cross-linked rubber thereof.

Means for Solving the Problem

The present inventors found, as a result of keen examinations, that it is possible to attain the above purpose by blending a predetermined highly-saturated nitrile rubber with specific silica, and came to complete the present invention based on the findings.

Therefore, according to the first aspect of the present invention, there is provided a cross-linkable nitrile rubber composition comprising a nitrile rubber (A1) including an α,β-ethylenically unsaturated nitrile monomer unit and having iodine value of 120 or less, silica (B1) having CaO value determined by X-ray fluorescence composition analysis of 0.5 wt % or more, and a crosslinking agent (C1).

In the first aspect, preferably, CaO value of said silica (B1) is 0.5 to 50 wt %.

In the first aspect, preferably, said nitrile rubber (A1) includes an α,β-ethylenically unsaturated dicarboxylic acid monoester monomer unit.

In the first aspect, preferably, a content of said silica (B1) is 5 to 300 parts by weight per 100 parts by weight of said nitrile rubber (A1).

In the first aspect, preferably, Mooney viscosity [$ML_{1+4}$ (100° C.)] of said nitrile rubber (A1) is 15 to 200.

In the first aspect, preferably, said cross-linkable nitrile rubber composition further comprises a silane coupling agent.

Alternatively, according to the second aspect of the present invention, there is provided a cross-linkable nitrile rubber composition comprising a nitrile rubber (A2) including an α,β-ethylenically unsaturated nitrile monomer unit and an α,β-ethylenically unsaturated dicarboxylic acid monoester monomer unit, and having iodine value of 120 or less, silica (B2) having pH of 8 or less, and a crosslinking agent (C2).

In the second aspect, preferably, said α,β-ethylenically unsaturated dicarboxylic acid monoester monomer unit is formed from a monoester monomer of dicarboxylic acid having a carboxyl group in each of two carbon atoms forming an α,β-ethylenically unsaturated bond. More preferably, said monoester monomer of dicarboxylic acid is a monoester monomer of dicarboxylic acid having said two carboxyl groups in a trans configuration.

In the second aspect, preferably, a content of said silica (B2) is 5 to 300 parts by weight per 100 parts by weight of said nitrile rubber (A2).

In the second aspect, preferably, Mooney viscosity [$ML_{1+4}$ (100° C.)] of said nitrile rubber (A2) is 15 to 200.

Also, according to the present invention, there is provided a cross-linked rubber obtained by crosslinking the cross-linkable rubber composition according to the above first or second aspects. The cross-linked rubber according to the present invention (the first and second aspects) is preferably used as a seal material or a belt material.

Effects of the Invention

According to the present invention (the first and second aspects), there can be provided a cross-linkable nitrile rubber composition capable of giving a highly-saturated cross-linked nitrile rubber having excellent mechanical properties such as elongation and small compression set, and excellent in workability, and a cross-linked rubber obtained by crosslinking the rubber composition.

BEST MODE FOR WORKING THE INVENTION

First Aspect

First Embodiment

First, a first embodiment according to the first aspect of the present invention will be described.

The cross-linkable nitrile rubber composition according to the first aspect of the present invention comprises a nitrile rubber (A1) including an α,β-ethylenically unsaturated nitrile monomer unit and having iodine value of 120 or less, silica (B1) having CaO value determined by X-ray fluorescence composition analysis of 0.5 wt % or more, and crosslinking agent (C1).

Note that, as seen above, the rubber (A1) including an α,β-ethylenically unsaturated nitrile monomer unit may be referred to as "nitrile rubber (A1)" in the first aspect (first embodiment).

Cross-linkable Nitrile Rubber Composition

Nitrile Rubber (A1)

A monomer forming the α,β-ethylenically unsaturated nitrile monomer unit of the nitrile rubber (A1) (α,β-ethylenically unsaturated nitrile monomer) may be any α,β-ethylenically unsaturated compound containing a nitrile group and not particularly limited, and there may be mentioned, acrylonitrile; α-halogenoacrylonitrile such as α-chloroacrylonitrile and α-bromoacrylonitrile; α-alkylacrylonitrile such as methacrylonitrile; etc. Among these, acrylonitrile and methacrylonitrile are preferable. As the α,β-ethylenically unsaturated nitrile monomer, one or more of these may be used in combination.

A content of the α,β-ethylenically unsaturated nitrile monomer units in the nitrile rubber (A1) is preferably 10 to 60 wt %, more preferably 15 to 55 wt % and particularly preferably 20 to 50 wt % per 100 wt % of all monomer units. When the content of the α,β-ethylenically unsaturated nitrile monomer unit is too small, oil resistance of the obtained cross-linked rubber may be reduced; in contrast, too large content may cause to reduce cold resistance.

It is preferable that the nitrile rubber (A1) further includes an α,β-ethylenically unsaturated dicarboxylic acid monoester monomer unit. By including the α,β-ethylenically unsaturated dicarboxylic acid monoester monomer unit in the nitrile rubber (A1), the cross-linkable nitrile rubber composition is able to give a cross-linked rubber, excellent in mechanical properties such as elongation, and particularly smaller in compression set.

A preferable method to include the α,β-ethylenically unsaturated dicarboxylic acid monoester monomer unit in the nitrile rubber (A1) is not particularly limited, and it is preferable to copolymerize an α,β-ethylenically unsaturated dicarboxylic acid monoester monomer with the above α,β-ethylenically unsaturated nitrile monomer.

As an organic group, which bonds to a carbonyl group via oxygen atom, of an ester moiety of the α,β-ethylenically unsaturated dicarboxylic acid monoester monomer, an alkyl group, a cycloalkyl group and an alkyl cycloalkyl group are preferable. Carbon number of the alkyl group is preferably 1 to 10, more preferably 2 to 6. Carbon number of the cycloalkyl group is preferably 5 to 12, more preferably 6 to 10. Carbon number of the alkyl cycloalkyl group is preferably 6 to 12, more preferably 7 to 10. When the carbon number of the organic group is too small, processing stability of the cross-linkable nitrile rubber composition may be decreased; in contrast, too large carbon number may cause to reduce crosslinking rate, or to reduce mechanical properties of the obtained cross-linked rubber.

Examples of the α,β-ethylenically unsaturated dicarboxylic acid monoester monomer may include a monoalkyl maleate such as monomethyl maleate, monoethyl maleate, monopropyl maleate and mono-n-butyl maleate; a monocycloalkyl maleate such as monocyclopentyl maleate, monocyclohexyl maleate and monocycloheptyl maleate; a monoalkylcycloalkyl maleate such as monomethylcyclopentyl maleate and monoethylcyclohexyl maleate; a monoalkyl fumarate such as monomethyl fumarate, monoethyl fumarate, monopropyl fumarate and mono-n-butyl fumarate; a monocycloalkyl fumarate such as monocyclopentyl fumarate, monocyclohexyl fumarate and monocycloheptyl fumarate; a monoalkylcycloalkyl fumarate such as monomethylcyclopentyl fumarate and monoethylcyclohexyl fumarate; a monoalkyl citraconate such as monomethyl citraconate, monoethyl citraconate, monopropyl citraconate and mono-n-butyl citraconate; a monocycloalkyl citraconate such as monocyclopentyl citraconate, monocyclohexyl citraconate and monocycloheptyl citraconate; a monoalkylcycloalkyl citraconate such as monomethyl cyclopentyl citraconate and monoethylcyclohexyl citraconate; a monoalkyl itaconate such as monomethyl itaconate, monoethyl itaconate, monopropyl itaconate and mono-n-butyl itaconate; a monocycloalkyl itaconate such as monocyclopentyl itaconate, monocyclohexyl itaconate and monocycloheptyl itaconate; a monoalkylcycloalkyl itaconate such as monomethylcyclopentyl itaconate and monoethyl cyclohexyl itaconate; etc.

Among these, because of more significantly showing the effects of the present invention as well as the reduction effect of Mooney viscosity [$ML_{1+4}$ (100° C.)] of the obtained cross-linkable nitrile rubber composition, a monoester of dicarboxylic acid having a carboxyl group in each of two carbon atoms forming an α,β-ethylenically unsaturated bond is preferable, which includes a butenedione acid monoester such as monopropyl maleate, mono-n-butyl maleate, monopropyl fumarate and mono-n-butyl fumarate; and monopropyl citraconate and mono-n-butyl citraconate; etc. Butenedione acid monoester is more preferable, and monoester of dicarboxylic acid having the two carboxyl groups in a trans configuration (trans position) such as monopropyl fumarate and mono-n-butyl fumarate is further preferable. Fumarate monoalkyl ester is particularly preferable, and mono-n-butyl fumarate is most preferable.

A content of the α,β-ethylenically unsaturated dicarboxylic acid monoester monomer units in the nitrile rubber (A1) is preferably 0.5 to 20 wt %, more preferably 1 to 15 wt % and particularly preferably 1.5 to 10 wt % per 100 wt % of all monomer units.

A content of the carboxyl groups in the nitrile rubber (A1), i.e. the number of carboxyl groups (number of moles) per 100 g of the nitrile rubber (A1), is preferably $5\times10^{-4}$ to $5\times10^{-1}$ ephr, more preferably $1\times10^{-3}$ to $1\times10^{-1}$ ephr and particularly preferably $5\times10^{-3}$ to $6\times10^{-2}$ ephr. When the content of the carboxyl groups in the nitrile rubber (A1) is too small, mechanical properties of the obtained cross-linked rubber may not be improved; and too large content may cause to reduce resistance to fatigue of the cross-linked rubber.

The nitrile rubber (A1) normally includes a diene monomer unit and/or α-olefin monomer unit in addition to the above α,β-ethylenically unsaturated nitrile monomer unit and α,β-ethylenically unsaturated dicarboxylic acid monoester monomer unit, for making the obtained cross-linked rubber elastic.

As a diene monomer forming the diene monomer unit, there may be mentioned a conjugated diene with carbon number of 4 or more such as 1,3-butadiene, isoprene, 2,3-dimethyl-1,3-butadiene and 1,3-pentadiene; a nonconjugated diene with carbon number of preferably 5 to 12 such as 1,4-pentadiene and 1,4-hexadiene; etc. Among these, the conjugated diene is preferable, and 1,3-butadiene is more preferable.

An α-olefin monomer forming the α-olefin monomer unit may preferably has carbon number of 2 to 12, and there may be exemplified ethylene, propylene, 1-butene, 4-methyl-1-pentene, 1-hexene, 1-octene, etc.

A content of the diene monomer units and/or α-olefin monomer units in the nitrile rubber (A1) is preferably 20 to 89.5 wt %, more preferably 30 to 84 wt % and particularly preferably 40 to 78.5 wt % per 100 wt % of all monomer units. When the content of these monomer units is too small, elasticity of the obtained cross-linked rubber may be reduced; and too large content may cause deterioration in heat resistance or chemical stability of the obtained cross-linked rubber.

The nitrile rubber (A1) may also include other units of monomers copolymerizable with an α,β-ethylenically unsaturated nitrile monomer, an α,β-ethylenically unsaturated dicarboxylic acid monoester monomer, and diene monomer and/or α-olefin monomer.

As the other monomers, there may be exemplified an α,β-ethylenically unsaturated carboxylic acid ester monomer other than the α,β-ethylenically unsaturated dicarboxylic acid monoester monomer, an aromatic vinyl monomer, a fluorine containing vinyl monomer, an α,β-ethylenically unsaturated monocarboxylic acid monomer, an α,β-ethylenically unsaturated polyvalent carboxylic acid monomer, an α,β-ethylenically unsaturated polyvalent carboxylic anhydride monomer, a copolymerizable anti-aging agent, etc.

As the α,β-ethylenically unsaturated carboxylic acid ester monomer other than the α,β-ethylenically unsaturated dicarboxylic acid monoester monomer, for example, there may be mentioned an acrylic acid alkyl ester and methacrylic acid alkyl ester with carbon number of an alkyl group of 1 to 18 such as methyl acrylate, ethyl acrylate, propyl acrylate, butyl acrylate, n-dodecyl acrylate, methyl methacrylate and ethyl methacrylate; an acrylic acid alkoxyalkyl ester and methacrylic acid alkoxyalkyl ester with carbon number of an alkoxyalkyl group of 2 to 12 such as methoxymethyl acrylate and methoxyethyl methacrylate; an acrylic acid hydroxyalkyl ester and methacrylic acid hydroxyalkyl ester with carbon number of a hydroxyalkyl group of 1 to 12 such as 2-hydroxyethyl acrylate, 2-hydroxyethyl methacrylate and 3-hydroxypropyl acrylate; a fluorine-substituted benzyl group containing acrylic acid ester and fluorine-substituted benzyl group containing methacrylic acid ester such as fluorobenzyl acrylate and fluorobenzyl methacrylate; a fluoroalkyl group containing acrylic acid ester and fluoroalkyl group containing methacrylic acid ester such as trifluoroethyl acrylate and tetrafluoropropyl methacrylate; an unsaturated polyvalent carboxylic acid polyalkyl ester such as dimethyl maleate, dimethyl fumarate, dimethyl itaconate and diethyl itaconate; an amino group containing α,β-ethylenically unsaturated carboxylic acid ester such as dimethylaminomethyl acrylate and diethylaminoethyl acrylate; etc.

As the aromatic vinyl monomer, styrene, α-methylstyrene, vinylpyridine, etc., may be mentioned.

As the fluorine containing vinyl monomer, fluoroethylvinyl ether, fluoropropylvinyl ether, o-trifluoromethylstyrene, vinyl pentafluorobenzoate, difluoroethylene, tetrafluoroethylene, etc., may be mentioned.

As the α,β-ethylenically unsaturated monocarboxylic acid monomer, acrylic acid, methacrylic acid, etc., may be mentioned.

As the α,β-ethylenically unsaturated polyvalent carboxylic acid monomer, maleic acid, fumaric acid, itaconic acid, citraconic acid, etc., may be mentioned.

As the α,βethylenically unsaturated polyvalent carboxylic anhydride monomer, maleic anhydride, etc. may be mentioned.

As the copolymerizable anti-aging agent, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, etc., may be mentioned.

These other copolymerizable monomers may be used singularly or in combination of two or more. A content of these other monomer units in the nitrile rubber (A1) when using other copolymerizable monomers is preferably 0 to 60 wt %, more preferably 0 to 50 wt % and particularly preferably 0 to 10 wt % per 100 wt % of all monomer units.

The nitrile rubber (A1) according to the first aspect has iodine value of 120 or less, preferably 80 or less, more preferably 25 or less and particularly preferably 15 or less. When iodine value of the nitrile rubber (A1) is too high, ozone resistance of the cross-linked rubber may be reduced.

Also, the nitrile rubber (A1) according to the first aspect has Mooney viscosity [$ML_{1+4}$ (100° C.)] of preferably 15 to 200, more preferably 30 to 150 and particularly preferably 45 to 120. When Mooney viscosity of the nitrile rubber (A1) is too low, mechanical properties of the obtained cross-linked rubber may be reduced. In contrast, too high Mooney viscosity may cause to reduce workability of the cross-linkable nitrile rubber composition.

A production method of the nitrile rubber (A1) according to the first aspect is not particularly limited. In general, a method to copolymerize the above-mentioned respective monomers, i.e. α,β-ethylenically unsaturated nitrile monomer, α,β-ethylenically unsaturated dicarboxylic acid monoester monomer, diene monomer and/or α-olefin monomer, and optionally-added other monomer copolymerizable therewith, is convenient and preferable. As a polymerization method, any known polymerization method, such as emulsion polymerization method, suspension polymerization method, bulk polymerization method or solution polymerization method, can be used, and emulsion polymerization method is preferable because it is easy to control the polymerization reaction.

When iodine value of the copolymer obtained by copolymerization is higher than the above range, the copolymer may be hydrogenated (hydrogenation reaction). A hydrogenation method is not particularly limited and any known method may be applicable.

Silica (B1)

The cross-linkable nitrile rubber composition according to the first aspect comprises silica (B1). The silica (B1) used in the first aspect has CaO value determined by X-ray fluorescence composition analysis of 0.5 wt % or more, preferably 0.5 to 50 wt % and more preferably 1 to 30 wt %. Note that the above CaO value indicates weight percent when measuring an amount of Ca (calcium) in the silica by an X-ray fluorescence analyzer to calculate in terms of oxide morphology (CaO). By using the silica (B1) including calcium having CaO value within the above range, the cross-linkable nitrile rubber composition can give a cross-linked rubber with particularly small compression set.

Note that in the first aspect, it is essential that calcium is present in the silica. For example, even if blending a filler including calcium aside from the silica so as to satisfy the above ratio per silica in the whole cross-linkable nitrile rubber composition, effects of the present invention cannot be obtained.

In the first aspect, CaO value of the silica is measured by a calibration curve method later-described in Examples.

As the silica (B1), either natural or synthetic silica having the above range of CaO value can be used, and because of easily controlling CaO value within the above range, synthetic silica is preferable. Also, as the silica (B1), any commercial silica having the above range of CaO value may be selected to use.

A content of the silica (B1) in the cross-linkable nitrile rubber composition of the present invention is preferably 5 to 300 parts by weight, more preferably 10 to 200 parts by weight and particularly preferably 20 to 100 parts by weight per 100 parts by weight of the nitrile rubber (A1). When the content of the silica (B1) component in the cross-linkable nitrile rubber composition is too small, mechanical properties of the obtained cross-linked rubber are not sufficiently improved, and compression set may be increased. In contrast, too large content may cause to reduce workability of the cross-linkable rubber composition.

Crosslinking Agent (C1)

The cross-linkable nitrile rubber composition according to the first aspect includes a crosslinking agent (C1). As the crosslinking agent (C1), there may be used any conventionally-known crosslinking agent, normally used for crosslinking in a rubber, such as polyamine compound, organic peroxide, polyvalent epoxy compound, polyvalent isocyanato compound, aziridine compound, sulfur compound, basic metallic oxide and organometallic halide. Among these, organic peroxide and polyamine compound are preferable, and polyamine compound (herein after it may be referred to as "polyamine-based crosslinking agent") is more preferable since its use can easily result in a cross-linked rubber with excellent mechanical properties and small compression set.

As the polyamine-based crosslinking agent, either of (I) a compound having 2 or more amino groups, or (II) a compound capable of giving configuration having 2 or more amino groups at crosslinking step may be used, and not particularly limited, but a compound, in which a plurality of hydrogen atoms of aliphatic hydrocarbon and aromatic hydrocarbon is substituted by amino group or hydrazide group (a structure expressed by —CONHNH$_2$ where CO indicates a carbonyl group), is preferable. The specific examples may include polyvalent aliphatic amines such as hexamethylene diamine, hexamethylene diamine carbamate, tetramethylenepentamine, hexamethylene diamine-cinnamaldehyde adduct and hexamethylene diamine-dibenzoate salt; polyvalent aromatic amines such as 2,2-bis[4-(4-aminophenoxy)phenyl]propane, 4,4'-methylenedianiline, m-phenylenediamine, p-phenylenediamine and 4,4'-methylene bis (o-chloroaniline); a compound having 2 or more hydrazide groups such as isophthalic acid dihydrazide, adipic acid dihydrazide and sebacic acid dihydrazide; etc. Among these, polyvalent aliphatic amines are preferable, and hexamethylene diamine carbamate is particularly preferable.

A content of the crosslinking agent (C1) in the cross-linkable nitrile rubber composition according to the first aspect is preferably 0.2 to 20 parts by weight, more preferably 1 to 15 parts by weight and particularly preferably 1.5 to 10 parts by weight per 100 parts by weight of the nitrile rubber (A1). When the content of the crosslinking agent (C1) is too small, it may be difficult to obtain a cross-linked rubber with excellent mechanical properties and small compression set. In contrast, too large content may cause to reduce resistance to fatigue of the obtained cross-linked rubber.

Other Components

The cross-linkable nitrile rubber composition according to the first aspect preferably includes a silane coupling agent in addition to the above nitrile rubber (A1), silica (B1) and crosslinking agent (C1). By including the silane coupling agent, compression set of the obtained cross-linked rubber can be made small.

As the silane coupling agent, any conventionally-known one can be used, and the type is not particularly limited, but a compound having a functional group formable of epoxy derivatives, amine derivatives or vinyl derivatives, such as γ-glycidoxypropyltrimethoxysilane, γ-glycidoxypropylmethyl dimethoxysilane, γ-glycidoxypropylmethyl diethoxysilane, γ-aminopropyltriethoxysilane, N-phenyl-γ-aminopropyltrimethoxysilane, N-β-(aminoethyl)-γ-aminopropylmethyldimethoxysilane, N-β-(aminoethyl)-γ-aminopropyltrimethoxysilane, vinyl trichlorosilane, vinyl triacetoxysilane, vinyl triethoxysilane, vinyltrimethoxysilane and vinyl tris(β-methoxyethoxy)silane, is preferable. Among these, γ-glycidoxypropyltrimethoxysilane is particularly preferable.

A content of the silane coupling agent in the cross-linkable nitrile rubber composition according to the first aspect is preferably 0.2 to 30 parts by weight, more preferably 0.5 to 10 parts by weight and particularly preferably 1 to 5 parts by weight per 100 parts by weight of the nitrile rubber (A1). When the content of the silane coupling agent is too small, an effect of addition of the silane coupling agent, i.e. an effect to further reduce compression set of the obtained cross-linked rubber, may not be obtained. In contrast, too large content may cause to decrease elongation of the cross-linked rubber.

Further, the cross-linkable nitrile rubber composition according to the first aspect may include a compounding agent, normally used in the rubber processing field, in addition to the above nitrile rubber (A1), silica (B1), crosslinking agent (C1) and silane coupling agent. As the compounding agent, for example, there may be mentioned a reinforcement filler such as carbon black, zinc acrylate and zinc methacrylate; a non-reinforcement filler such as calcium carbonate and clay, an anti-aging agent, a light stabilizer, an antiscorching agent such as a primary amine, a plasticizer, a processing aid, a lubricant, an adhesive, a lubricating agent, a flame-retardant, a fungicide, an acid acceptor, an antistatic agent, a coloring agent, a crosslinking accelerator, cross-linking auxiliaries, a cross-linking retardant, etc. Amounts of these compounding agents are not particularly limited as far as they are in the range not to disturb the purpose and effects of the present invention, and those suitable for the purpose of blending can be appropriately selected.

Also, the cross-linkable nitrile rubber composition according to the first aspect may include rubbers other than the nitrile rubber (A1) within the range not to disturb the purpose and effects of thereof. A content of the other rubbers is preferably 50 parts by weight or less, more preferably 10 parts by weight or less, per 100 parts by weight of the nitrile rubber (A1).

The cross-linkable rubber composition according to the first aspect is prepared by mixing each of the above components, preferably in a nonaqueous condition. A method of preparing the cross-linkable rubber composition according to the first aspect is not limited, and normally, components excluding ingredients unstable to heat such as the crosslinking agent, cross-linking auxiliaries, etc., are primarily kneaded in a mixer such as a Bambury mixer, intermixer and kneader, and then secondarily kneaded after transferring it into a roll, etc. and adding the crosslinking agent, etc.

The cross-linkable nitrile rubber composition according to the first aspect has Mooney viscosity [ML$_{1+4}$ (100° C.)] (compound Mooney) of preferably 15 to 150 and more preferably 50 to 100, and shows excellent workability.

Cross-Linked Rubber

The cross-linked rubber according to the first aspect of the present invention is obtained by crosslinking the above cross-linkable nitrile rubber composition.

The cross-linked rubber according to the first aspect of the present invention can be obtained by molding by using a molding machine suitable for a desired shape, e.g. an extruder, an injection molding machine, a compactor, a roll and the like, and fixing a shape as a cross-linked rubber by crosslinking reaction. It may be cross-linked after molding or simultaneously. Molding temperature is normally 10 to 200° C., preferably 25 to 120° C. Cross-linking temperature is normally 100 to 200° C., preferably 130 to 190° C., and cross-linking time is normally 1 minute to 24 hours, preferably 2 minutes to 1 hour.

Also, depending on the shape, size, etc., of the cross-linked rubber, the inside may not be sufficiently cross-linked even if the surface is cross-linked, so that it may be secondarily cross-linked by further heating.

The cross-linked rubber according to the first aspect of the present invention is excellent in mechanical properties such as elongation and particularly small in compression set in addition to properties of a nitrile group containing highly-saturated copolymer rubber that include excellent oil resistance, heat resistance and ozone resistance. Note that in the first aspect, compression set is preferably 45% or less and particularly preferably 40% or less in terms of a value of "Disk compression set" (a value of Disk compression set at 150° C. after 504 hours) measured by the later-mentioned "Disk set test". It is also preferably 55% or less and particularly preferably 50% or less in terms of a value of "O-ring compression set" (a value of O-ring compression set at 150° C. after 168 hours) measured by the later-mentioned "O-ring Set test".

Such a cross-linked rubber according to the first aspect can be, based on the above properties, preferably used in wide range of application including a variety of rubber members for seal such as O-ring, packing, diaphragm, oil-seal, shaft seal, bearing seal, mechanical seal, wellhead seal, electric/electronic seal, seal for pneumatic device, hermetic seal of flon gas, hydrofluorocarbon or carbon dioxide used in cooling apparatus for an air conditioner and a compressor for a refrigerator of an air-conditioning system, hermetic seal of supercritical carbon dioxide or subcritical carbon dioxide used in cleaning media of precision cleaning, seal for a rolling system (e.g. an antifriction bearing, an automobile hub unit, an automobile water pump, a linear guide device and a ball screw), valve and valve sheet, BOP (Blow Out Preventar), and platter; and a variety of gaskets such as intake manifold gasket loaded on an articulated portion between intake manifold and cylinder head, cylinder head gasket loaded on an articulated portion between cylinder block and cylinder head, rocker cover gasket loaded on an articulated portion between rocker cover and cylinder head, oil pan gasket loaded on an articulated portion between oil pan and cylinder block or gearbox casing, gasket for fuel-cell separator loaded between a pair of housings sandwiching a unit cell having positive electrode, electrolyte plate and negative electrode, and gasket for a top cover of hard disc drive; etc.

Also, the cross-linked rubber according to the first aspect can be used in wide range of application including a variety of rolls such as printing roll, iron-making roll, papermaking roll, industrial roll and roll for business equipment; a variety of belts such as flat belt (e.g. film core flat belt, code flat belt, multilayer flat belt and monolithic flat belt), V belt (e.g. lapped V belt and low-edge V belt), V ribbed belt (single V ribbed belt, double V ribbed belt, lapped V ribbed belt, back rubber V ribbed belt and upper cog V ribbed belt), CVT belt, timing belt, toothed belt and conveyer belt; a variety of hoses such as fuel hose, turbo air hose, oil hose, radiator hose, heater hose, water hose, vacuum brake hose, control hose, air-conditioner hose, brake hose, power steering hose, air hose, marine hose, riser and flow line; a variety of boots such as CVJ boots, propeller shaft boots, constant-velocity joint boots and rack-and-pinion boots; attenuation rubber components such as cushion material, dynamic damper, rubber coupling, air spring and vibration-proofing materials; dust cover, automobile interior member, tire, jacketed cable, shoe sole, electromagnetic shielding, adhesive for flexible printed circuit board and fuel-cell separator, as well as those for cosmetic field and medical field, food-related field and electronics field.

Second Aspect

Second Embodiment

Next, the second embodiment, an embodiment according to the second aspect of the present invention, will be described.

The cross-linkable nitrile rubber composition according to the second aspect of the present invention comprises nitrile rubber (A2) including an α,β-ethylenically unsaturated nitrile monomer unit and α,β-ethylenically unsaturated dicarboxylic acid monoester monomer unit and having iodine value of 120 or less, silica (B2) having pH of 8 or less, and crosslinking agent (C2).

Note that, as seen above, the rubber (A2) including an α,β-ethylenically unsaturated nitrile monomer unit and an α,β-ethylenically unsaturated dicarboxylic acid monoester monomer unit may be referred to as "nitrile rubber (A2)" in the second aspect (second embodiment).

Cross-linkable Nitrile Rubber Composition

Nitrile Rubber (A2)

As a monomer forming the α,β-ethylenically unsaturated nitrile monomer unit in the nitrile rubber (A2) according to the second aspect, the same monomer as the above-mentioned nitrile rubber (A1) of the first aspect can be used. Also, a content of the α,β-ethylenically unsaturated nitrile monomer units may be same as in nitrile rubber (A1) of the above-mentioned first aspect.

The nitrile rubber (A2) according to the second aspect essentially includes an α,β-ethylenically unsaturated dicarboxylic acid monoester monomer unit in addition to the α,β-ethylenically unsaturated nitrile monomer unit. According to the second aspect, by including the α,β-ethylenically unsaturated dicarboxylic acid monoester monomer unit as well as silica (B2) having specific pH, it is possible to provide a cross-linkable nitrile rubber composition, capable of giving a cross-linked rubber having excellent mechanical properties such as tensile strength and elongation, and particularly small compression set.

As a method to include the α,β-ethylenically unsaturated dicarboxylic acid monoester monomer unit in the nitrile rubber (A2) according to the second aspect, a method to copolymerize an α,β-ethylenically unsaturated dicarboxylic acid monoester monomer with the α,β-ethylenically unsaturated nitrile monomer is preferable, as in the above-mentioned nitrile rubber (A1) of the first aspect. As the α,β-ethylenically unsaturated dicarboxylic acid monoester monomer used for including the α,β-ethylenically unsaturated dicarboxylic acid monoester monomer unit in this case, the same monomer as the above-mentioned nitrile rubber (A1) of the first aspect can be used. Also, a content of the α,β-ethylenically unsaturated dicarboxylic acid monoester monomer units in the nitrile rubber (A2) and a content of carboxyl groups may be same as in the above-mentioned nitrile rubber (A1) of the first aspect.

As with the above-mentioned nitrile rubber (A1) of the first aspect, the nitrile rubber (A2) normally includes a diene monomer unit and/or α-olefin monomer unit in addition to the above α,β-ethylenically unsaturated nitrile monomer unit and α,β-ethylenically unsaturated dicarboxylic acid monoester monomer unit. As a diene monomer and α-olefin monomer forming the diene monomer unit and α-olefin monomer unit in the nitrile rubber (A2), the same monomer as the above-mentioned nitrile rubber (A1) of the first aspect can be used. Also, content of the diene monomer units and/or α-olefin monomer units may be same as in the nitrile rubber (A1) of the above-mentioned first aspect.

As with the above-mentioned nitrile rubber (A1) of the first aspect, the nitrile rubber (A2) can include other monomer unit copolymerizable with the α,β-ethylenically unsaturated nitrile monomer, α,β-ethylenically unsaturated dicarboxylic acid monoester monomer, and diene monomer and/or α-olefin monomer. As the other monomers, those same as in the above-mentioned nitrile rubber (A1) of the first aspect can be used. Also, contents of the other monomer units may be same as in the above-mentioned nitrile rubber (A1) of the first aspect.

Iodine value and Mooney viscosity [$ML_{1+4}$ (100° C.)] of the nitrile rubber (A2) according to the second aspect may be in the same range as in the above-mentioned nitrile rubber (A1) of the first aspect, and further, a production method thereof may be same as with the above-mentioned nitrile rubber (A1) of the first aspect.

Silica (B2)

The cross-linkable nitrile rubber composition according to the second aspect includes silica (B2). The silica (B2) used in the second aspect has pH of 8 or less. The pH of the silica (B2) is preferably 7 or less, more preferably 6 or less, further preferably 5 or less and particularly preferably 4 or less. Also, the pH of the silica (B2) is preferably 1 or more, more preferably 2 or more. By using the silica (B2) having the above range of pH, it is possible to obtain a cross-linked rubber having excellent and mechanical properties such as tensile strength and elongation, and small compression set.

Note that the above pH is obtained by suspending 5 g of silica in 100 ml of carbonic acid-free distilled water, and measuring pH value of the suspension at 20° C. by a pH measurement device having a glass electrode.

As the silica (B2), either natural or synthetic silica satisfying the above range of pH can be used, and because of easily controlling pH value within the above range, synthetic silica is preferable. As the synthetic silica, either wet silica (hydrous silicic acid) or dry silica (anhydrous silicic acid) can be used, but dry silica is preferable.

A content of the silica (B2) in the cross-linkable nitrile rubber composition according to the second aspect is preferably 5 to 300 parts by weight, more preferably 10 to 200 parts by weight and particularly preferably 20 to 100 parts by weight per 100 parts by weight of the nitrile rubber (A2). When the content of the silica (B2) in the cross-linkable nitrile rubber composition is too small, mechanical properties of the obtained cross-linked rubber may not be sufficiently improved and compression set may be increased. In contrast, too large content may cause to reduce workability of the cross-linkable rubber composition.

Crosslinking Agent (C2)

The cross-linkable nitrile rubber composition according to the second aspect includes a crosslinking agent (C2). As the crosslinking agent (C2) used in the second aspect, the same crosslinking agent can be used as in the above-mentioned cross-linkable nitrile rubber composition according to the first aspect. Also, the content may be same as in the above-mentioned cross-linkable nitrile rubber composition according to the first aspect.

Other Components

The cross-linkable nitrile rubber composition according to the second aspect can include a silane coupling agent and other compounding agent normally used in the rubber processing field, in addition to the above nitrile rubber (A2), silica (B2) and crosslinking agent (C2). As the silane coupling agent and other compounding agent, the same one can be used as in the above-mentioned first aspect.

Also, the cross-linkable nitrile rubber composition according to the second aspect may include rubbers other than the nitrile rubber (A2) within the range not to disturb the purpose and effects thereof. A content of the other rubbers is preferably 50 parts by weight or less, more preferably 10 parts by weight or less, per 100 parts by weight of the nitrile rubber (A2).

As a method to prepare the cross-linkable nitrile rubber composition according to the second aspect, although not particularly limited, the same method can be applied as in the above-mentioned cross-linkable nitrile rubber composition according to the first aspect.

The cross-linkable nitrile rubber composition according to the second aspect has Mooney viscosity [$ML_{1+4}$ (100° C.)] (compound Mooney) of preferably 15 to 150, more preferably 50 to 100, showing excellent workability.

Cross-Linked Rubber

The cross-linked rubber according to the second aspect of the present invention is obtained by crosslinking the above cross-linkable nitrile rubber composition.

Methods to obtain the cross-linked rubber according to the second aspect of the present invention (i.e. molding method, crosslinking conditions) may be same as in the above-mentioned first aspect. Also, secondary crosslink may be performed if needed.

The cross-linked rubber according to the second aspect of the present invention is, in addition to properties of a nitrile group containing highly-saturated copolymer rubber that include excellent oil resistance, heat resistance and ozone resistance, excellent in mechanical properties such as tensile strength and elongation, and particularly small in compression set. Particularly, this allows highly balancing between mechanical properties, such as tensile strength and elongation, and compression set. Note that in the second aspect, compression set is preferably 40% or less and particularly preferably 30% or less in terms of a value of "Disk compression set" (a value of Disk compression set at 150° C. after 168 hours) measured by the later-mentioned "Disk set test". It is also preferably 60% or less in terms of a value of "O-ring compression set" (a value of O-ring compression set at 150° C. after 168 hours) measured by the later-mentioned "O-ring Set test".

Such a cross-linked rubber according to the second aspect can be used, based on the above properties, in various applications, as with the above-mentioned cross-linked rubber according to the first aspect, for example.

EXAMPLES

Hereinafter, the present invention will be specifically described based on Production Examples, Examples and Comparative Examples, but the present invention is not limited to these examples. Note that "parts" in the following indicates a weight base unless otherwise designated.

Examples and Comparative Example According to the First Aspect

First, a production example (Production Example 1-1), examples (Examples 1-1 to 1-4) and a comparative example (Comparative Examples 1-1) according to the first aspect will be described. Note that each of the following tests and evaluations (1) to (8) is performed in the Examples and Comparative Example according to the first aspect.

(1) Content of Carboxyl Groups

The content of carboxyl groups of the nitrile rubber was obtained by neutralization titration of nitrile rubber-dissolved aqueous tetrahydrofuran solution by using 0.02N ethanol solution of potassium hydroxide with thymolphthalein as the indicator at room temperature to measure the number of carboxyl groups (number of moles, the unit is ephr) per 100 g of the rubber.

(2) Iodine Value

Iodine value was measured in accordance with JIS K6235.

(3) Mooney Viscosity [$ML_{1+4}$ (100° C.)]

Mooney viscosity (polymer Mooney) of the nitrile rubber and Mooney viscosity (compound Mooney) of the cross-linkable rubber composition were measured in accordance with JIS K6300.

(4) Calcium Content in Silica

Calcium content in the silica was measured by an X-ray fluorescence analyzer. Specifically, the peak obtained in the X-ray fluorescence analysis was quantified by a calibration curve method, and the calcium content was calculated in a weight percent (wt %) in terms of oxide morphology (CaO value).

(5) Physical Property after Secondary Crosslink (Elongation)

The cross-linkable rubber composition was cross-linked at 170° C. for 20 minutes at a pressing pressure of 10 MPa (primary crosslink), followed by secondary crosslink in a geared oven at 170° C. for 4 hours, to produce a test specimen. Then, using the obtained test specimen, elongation of the cross-linked rubber was measured in accordance with JIS K6251.

(6) Heat Aging Test [Elongation, Rate of Change in Elongation (170° C., 168 Hours)]

Using a test specimen produced by primary and secondary crosslink as in the above (5), elongation at 170° C. after 168 hours and the rate of change (%) due to heat aging were obtained in accordance with JIS K6257 (normal oven method).

(7) Disk Set Test [Disk Compression Set (150° C., 504 Hours)]

By using a mold with an inner diameter of 29 mm and a depth of 12.5 mm, the cross-linkable nitrile rubber composition was cross-linked at 170° C. and a pressing pressure of 10 MPa for 20 minutes, followed by secondary crosslink at 170° C. for 4 hours, to obtain a test specimen for Disk set test. Disk compression set was measured under conditions maintaining the cross-linked rubber in a 25%-compressed state at 150° C. for 504 hours in accordance with JIS K6262.

(8) O-Ring Set Test [O-Ring Compression Set (150° C., 168 Hours)]

By using a mold with an inner diameter of 30 mm and a ring diameter of 3 mm, the cross-linkable nitrile rubber composition was cross-linked at 170° C. and a pressing pressure of 10 MPa for 20 minutes, followed by secondary crosslink at 170° C. for 4 hours, to obtain a test specimen for O-ring set test. O-ring compression set was measured according to JIS K6262 under a condition of compressing a distance of two planes sandwiching an O-ring by 25% in a ring thickness direction at 150° C. for 168 hours.

Production Example 1-1

To a metallic bottle, 180 parts of ion-exchange water, 25 parts of sodium dodecylbenzenesulfonate (emulsifier) solution in a concentration of 10 wt %, 37 parts of acrylonitrile, 8 parts of mono-n-butyl fumarate and 0.5 part of t-dodecyl mercaptan (molecular weight modifier) were added in sequence, and after replacing the internal gas with nitrogen three times, 55 parts of 1,3-butadiene were added. The metallic bottle was kept at 5° C., and added with 0.1 part of cumene hydroperoxide (polymerization catalyst) to continue polymerization reaction for 16 hours with rotating the metallic bottle. Next, 0.1 part of hydroquinone (polymerization terminator) aqueous solution in a concentration of 10 wt % was added to terminate the polymerization, and the remaining monomers were removed by using a rotary evaporator with a water-temperature of 60° C. to obtain a latex of an acrylonitrile-butadiene-mono-n-butyl fumarate copolymer rubber (with a concentration of solid contents of about 30 wt %) consisting of 34 wt % of acrylonitrile units, 59 wt % of butadiene units and 7 wt % of mono-n-butyl fumarate units.

So as to have a palladium content of 1,000 ppm with respect to dry weight of the rubber included in the above obtained latex, the above produced latex and palladium catalyst (a mixed solution of equivalent weights of 1 wt % palladium acetate-acetone solution and ion-exchange water) were added into an autoclave, and hydrogenation reaction was performed at a hydrogen pressure of 3 MPa and a temperature of 50° C. for 6 hours to obtain a nitrile group containing highly-saturated copolymer rubber latex.

The obtained nitrile group containing highly-saturated copolymer rubber latex was added with a double volume of methanol to coagulate the nitrile group containing highly-saturated copolymer rubber. Then, the rubber was vacuum dried at 60° C. for 12 hours to obtain a nitrile rubber (A1-1). Iodine value of the nitrile rubber (A1-1) was 10, content of carboxyl groups was $4.2 \times 10^{-2}$ ephr, and Mooney viscosity [$ML_{1+4}$, 100° C.] was 48.

Example 1-1

By using a Banbury mixer, 100 parts of the above produced nitrile rubber (A1-1) was added with 40 parts of wet silica (product name "Tokusil GU" manufactured by Tokuyama Corporation, having CaO value determined by X-ray fluorescence composition analysis of 2.3 wt %), 1 part of stearic acid, 5 parts of a plasticizer (ADEKA CIZER C-8 manufactured by Asahi Denka Company Limited), 1.5 parts of substituted diphenylamine (Naugard 445 manufactured by Uniroyal Inc.) and 1.5 parts of 2-mercaptobenzimidazole (NOCRAC MB manufactured by Ouchi Shinko Chemical Industrial) and mixed. Next, the obtained mixture was transferred to a roll and added with 2 parts of 3-di-o-tolylguanidine (NOCCELER DT manufactured by Ouchi Shinko Chemical Industrial, a crosslinking accelerator) and 3.4 parts of hexamethylene diamine carbamate (Diak#1 manufactured by DuPont Dow Elastomers L.L.C., a crosslinking agent) to knead, so that a cross-linkable nitrile rubber composition with compound Mooney viscosity of 85 was prepared. Then, by using the obtained cross-linkable nitrile rubber composition, each evaluation of physical properties after secondary crosslink, heat aging test, Disk set test and O-ring set test was carried out. The results are shown in Table 1.

Example 1-2

Except for further adding 2 parts of γ-glycidoxypropyltrimethoxysilane (product name "A-187" manufactured by Nippon Unicar Company Limited) at mixing by the Banbury mixer, same procedures as in the Example 1-1 were conducted to prepare a cross-linkable nitrile rubber composition. For the obtained cross-linkable nitrile rubber composition, each evaluation was done as in the Example 1-1. The results are shown in Table 1.

Examples 1-3 and 1-4 and Comparative Example 1-1

Instead of wet silica (product name "Tokusil GU") were respectively used wet silica (product name "SILTON R2" manufactured by Mizusawa Industrial Chemicals Ltd., having CaO value determined by X-ray fluorescence composition analysis of 1.9 wt %: Examples 1-3), wet silica (product name "SOLEX CM" manufactured by Tokuyama Corporation, having Cao value determined by X-ray fluorescence composition analysis of 21.2 wt %: Examples 1-4) and wet silica (product name "Carplex #1120" manufactured by Shionogi & Co., Ltd., having CaO value determined by X-ray fluorescence composition analysis of less than 0.1 wt %: Comparative Example 1-1) in the same amount, and same procedures as in the Example 1-1 were conducted to prepare a cross-linkable nitrile rubber composition for each example.

Each of the obtained cross-linkable nitrile rubber composition was subject to same evaluation as in the Example 1-1. The results are shown in Table 1.

and Comparative Examples according to the second aspect, each of the following tests and evaluations (9) to (16) was performed.

(9) Content of Carboxyl Groups

The content of carboxyl groups in the nitrile rubber was measured as with (1) in the first aspect.

(10) Iodine Value

Iodine value was measured as with (2) in the first aspect.

(11) Mooney Viscosity [$ML_{1+4}$ (100° C.)]

Mooney viscosity (polymer Mooney) of the nitrile rubber and Mooney viscosity (compound Mooney) of the cross-linkable rubber composition were measured as with (3) in the first aspect.

(12) pH of Silica pH of the silica was obtained by suspending 5 g of silica in 100 ml of carbonic acid-free distilled water and measuring pH value of the suspension at 20° C. by using a pH measurement device having a glass electrode.

TABLE 1

|  |  |  | Examples | | | | Comparative Example |
|---|---|---|---|---|---|---|---|
|  |  |  | 1-1 | 1-2 | 1-3 | 1-4 | 1-1 |
| Cross-linkable Nitrile Rubber Composition Tests & Evaluations | Silica | Product Name | Tokusil GU | Tokusil GU | SILTON R2 | SOLEX CM | Carplex #1120 |
|  |  | CaO value* (%) | 2.3 | 2.3 | 1.9 | 21.2 | <0.1 |
|  | Silane Coupling Agent Product Name |  | — | A-187 | — | — | — |
|  | Compound Mooney [$ML_{1+4}$ (100° C.)] |  | 85 | 89 | 98 | 88 | 113 |
|  | Physical Properties after Secondary Crosslink | Elongation (%) | 190 | 130 | 180 | 200 | 280 |
|  |  | Disk Compression Set (150° C., 504 hours) (%) | 41 | 38 | 38 | 38 | 66 |
|  |  | O-ring Compression Set (150° C., 168 hours) (%) | 52 | 45 | 46 | 50 | 78 |
|  | Heat Aging Test | Elongation (%) | 160 | 100 | 140 | 140 | 180 |
|  |  | Rate of Change in Elongation (%) | −16 | −23 | −22 | −30 | −36 |

*CaO values were determined by X-ray fluorescence composition analysis

Evaluation of Examples and Comparative Example According to the First Aspect

As shown in Table 1, in the Comparative Example 1-1 not satisfying the requirement of the present invention (the invention according to the first aspect) because of using silica with smaller calcium content (CaO amount), the highly-saturated cross-linked nitrile rubber obtained by crosslink resulted in showing large compression set in both tests.

On the other hand, in the Examples 1-1 to 1-4 using silica satisfying the predetermined calcium content (CaO amount) of the present invention (the invention according to the first aspect), it was possible to obtain highly-saturated cross-linked nitrile rubbers with small compression set. Note that it was shown, by comparing Examples 1-1 and 1-2, that compression set was further reduced when adding the silane coupling agent to the predetermined silica of the present invention (the invention according to the first aspect). Further, any cross-linkable rubber compositions of the Examples 1-1 to 1-4 had compound Mooney [$ML_{1+4}$ (100° C.)] of 100 or less, indicating excellent workability.

Examples and Comparative Examples According to the Second Aspect

Next, Production Examples (Production Examples 2-1 and 2-2), Examples (Examples 2-1 to 2-5) and Comparative Examples (Comparative Examples 2-1 and 2-2) according to the second aspect will be described. Note that in the Examples

(13) Physical Properties (Tensile Strength and Elongation) after Secondary Crosslink The cross-linkable rubber composition was cross-linked at 170° C. for 20 minutes at a pressing pressure of 10 MPa (primary crosslink), followed by secondary crosslink in a geared oven at 170° C. for 4 hours to produce a test specimen. Then, by using the obtained test specimen, tensile strength and elongation of the cross-linked rubber were measured in accordance with JIS K6251.

(14) Heat Aging Test [Tensile Strength, Elongation and Rate of Change in Elongation (150° C., 504 Hours)]

By using a test specimen produced by primary and secondary crosslink similar to the above (13), tensile strength, elongation and rate of change (%) thereof due to heat aging, at 150° C. after 504 hours, were obtained in accordance with JIS K6257 (normal oven method).

(15) Disk Set Test [Disk Compression Set (150° C., 168 Hours)]

By using a mold with an inner diameter of 29 mm and a depth of 12.5 mm, a cross-linkable nitrile rubber composition was cross-linked at 170° C. and a pressing pressure of 10 MPa for 20 minutes, followed by secondary crosslink at 170° C. for 4 hours to obtain a test specimen for Disk set test. Disk compression set was measured under conditions maintaining the cross-linked rubber in a 25%-compressed state at 150° C. for 168 hours in accordance with JIS K6262.

(16) O-Ring Set Test [O-Ring Compression Set (150° C., 168 Hours)]

O-ring compression set was measured as in (8) of the first aspect.

Production Example 2-1

Similar to the Production Example 1-1 in the first aspect, a nitrile rubber (A2-1: hydrogenated acrylonitrile-butadiene-mono-n-butyl fumarate copolymer rubber, having iodine value of 10, carboxyl group content of $4.2 \times 10^{-2}$ ephr and Mooney viscosity [$ML_{1+4}$, 100° C.] of 48) was produced.

Production Example 2-2

Except for using 37 parts of acrylonitrile and 63 parts of 1,3-butadiene without using mono-n-butyl fumarate, same procedures as in the Production Example 1-1 of the first aspect were conducted to obtain a latex of an acrylonitrile-butadiene copolymer rubber with acrylonitrile monomer units of 37 wt % and butadiene monomer units of 63 wt %. This rubber was subject to hydrogenation reaction as in the Production Example 1-1 to prepare a nitrile rubber (A2-2). The nitrile rubber (A2-2) had iodine value of 10 and Mooney viscosity [$ML_{1+4}$, 100° C.] of 65.

Example 2-1

By using a Banbury mixer, 100 parts of the above produced nitrile rubber (A2-1) were added with 40 parts of dry silica (product name "Aerosil R972V" manufactured by Nippon Aerosil Co., Ltd., having pH of 3.8), 1 part of stearic acid, 5 parts of a plasticizer (ADEKA CIZER C-8 manufactured by Asahi Denka Company Limited), 1.5 parts of a substituted diphenylamine (Naugard 445 manufactured by Uniroyal Inc.) and 1.5 parts of 2-mercaptobenzimidazole (NOCRAC MB manufactured by Ouchi Shinko Chemical Industrial) and mixed. Next, the obtained mixture was transferred to a roll and added with 2 parts of 3-di-o-tolylguanidine (NOC-CELER DT manufactured by Ouchi Shinko Chemical Industrial, a crosslinking accelerator) and 3.4 parts of hexamethylene diamine carbamate (Diak#1 manufactured by DuPont Dow Elastomers L.L.C., a crosslinking agent) to knead, so that a cross-linkable nitrile rubber composition having compound Mooney viscosity of 87 was prepared. Then, by using the obtained cross-linkable nitrile rubber composition, physical properties after secondary crosslink, heat aging test, Disk set test and O-ring set test was respectively evaluated. The results are shown in Table 2.

Examples 2-2 to 2-5

Instead of dry silica "Aerosil R972V" used in Example 2-1 were respectively used wet silica (product name "Carplex #80" manufactured by Shionogi & Co., Ltd., having pH of 4.5: Example 2-2), wet silica (product name "Tokusil U" manufactured by Tokuyama Corporation, having pH of 5.5: Example 2-3), wet silica (product name "Nipsil VN-3" manufactured by Nihon Silica Co., Ltd., having pH of 6.0: Example 2-4) and wet silica (product name "Nipsil ER" manufactured by Nihon silica Co., Ltd., having pH of 7.8: Example 2-5) in the same amount, and same procedures as in the Examples 2-1 were conducted to prepare a cross-linkable nitrile rubber composition for each example.

Each of the obtained cross-linkable nitrile rubber composition was subject to same evaluation as in the Example 2-1. The results are shown in Table 2.

Comparative Example 2-1

Except for using 100 parts of nitrile rubber (A2-2) instead of nitrile rubber (A2-1), 8 parts of 1,3-bis(t-butylperoxyisopropyl)benzene (Vulcup 40KE manufactured by Hercules Inc.) instead of 3.4 parts of hexamethylene diamine carbamate and without adding 3-di-o-tolylguanidine, same procedures as in the Examples 2-1 were conducted to prepare a cross-linkable nitrile rubber composition.

The obtained cross-linkable nitrile rubber composition was subject to each evaluation as in the Example 2-1. The results are shown in Table 2.

Comparative Example 2-2

Except for using 40 parts of wet silica (product name "Carplex #1120" manufactured by Shionogi & Co., Ltd., having pH of 10.7) instead of dry silica "Aerosil R972V", same procedures as in the Example 2-1 were conducted to prepare a cross-linkable nitrile rubber composition.

The obtained cross-linkable nitrile rubber composition was subject to each evaluation as in the Example 2-1. The results are shown in Table 2.

TABLE 2

| | | | Examples | | | | | Comparative Examples | |
|---|---|---|---|---|---|---|---|---|---|
| | | | 2-1 | 2-2 | 2-3 | 2-4 | 2-5 | 2-1 | 2-2 |
| Cross-linkable Nitrile Rubber Composition Tests & Evaluations | Nitrile Rubber | | (A2-1) | (A2-1) | (A2-1) | (A2-1) | (A2-1) | (A2-2) | (A2-1) |
| | Silica | Product Name | Aerosil R972V | Carplex #80 | Tokusil U | Nipsil VN-3 | Nipsil ER | Aerosil R972V | Carplex #1120 |
| | | pH | 3.8 | 4.5 | 5.5 | 6.0 | 7.8 | 3.8 | 10.7 |
| | Compound Mooney [$ML_{1+4}$ (100° C.)] | | 87 | 87 | 81 | 82 | 100 | 125 | 113 |
| | Physical Properties after Secondary Crosslink | Tensile Strength (MPa) | 19.9 | 20.2 | 19.1 | 21.6 | 17.1 | 29.0 | 23.4 |
| | | Elongation (%) | 240 | 250 | 230 | 270 | 200 | 520 | 280 |
| | Heat Aging Test | Tensile Strength (MPa) | 16.4 | 24.6 | 23.6 | 23.1 | 22.7 | 27.2 | 23.7 |
| | | Elongation (%) | 160 | 180 | 170 | 180 | 150 | 390 | 150 |
| | | Rate of Change in Elongation (%) | −33 | −28 | −26 | −33 | −25 | −25 | −46 |
| | Disk Compression Set (150° C., 168 hours) (%) | | 15 | 28 | 26 | 26 | 22 | 45 | 58 |
| | O-ring Compression Set (150° C., 168 hours) (%) | | 51 | 59 | 52 | 59 | 46 | 80 | 78 |

Evaluation of Examples and Comparative Examples According to the Second Aspect

In the Comparative Examples 2-1, not satisfying the requirement of the present invention (the invention according to the second aspect) because of using nitrile rubber having no α,β-ethylenically unsaturated dicarboxylic acid monoester monomer unit, compression set was not improved. Also, in the Comparative Examples 2-2 not satisfying the requirement of the present invention (the invention according to the second aspect) because of using silica with pH of more than 8, compression set was not improved.

On the other hand, in the Examples 2-1 to 2-5, satisfying the requirements of the present invention (the invention according to the second aspect), it is possible to obtain cross-linked rubbers having excellent mechanical properties such as tensile strength and elongation, and small compression set. Also, the cross-linkable rubber compositions of the Examples 2-1 to 2-5 had compound Mooney of 100 or less, indicating excellent workability.

The invention claimed is:

1. A cross-linkable nitrile rubber composition comprising a nitrile rubber (A1), including 10 to 60 wt % of acrylonitrile unit, 20 to 89.5 wt % of 1,3-butadiene unit and 0.5 to 20 wt % of α,β-ethylenically unsaturated dicarboxylic acid monoester monomer unit and having iodine value of 120 or less, a silica (B1) having CaO value determined by X-ray fluorescence composition analysis of 1 to 30 wt %, and a polyamine-based crosslinking agent (C1),
wherein a content of said silica (B1) is more than 20 and 300 or less parts by weight per 100 parts by weight of said nitrile rubber (A1).

2. The cross-linkable nitrile rubber composition as set forth in claim 1, wherein Mooney viscosity [$ML_{1+4}(100°\ C.)$] of said nitrile rubber (A1) is 15 to 200.

3. The cross-linkable nitrile rubber composition as set forth in claim 1, further comprising a silane coupling agent.

4. A cross-linked rubber obtained by crosslinking the cross-linkable nitrile rubber composition as set forth in claim 1.

5. The cross-linked rubber as set forth in claim 4, which is a belt or seal material.

6. The cross-linkable nitrile rubber composition as set forth in claim 1, wherein said α,β-ethylenically unsaturated dicarboxylic acid monoester monomer unit is formed from a monoester monomer of dicarboxylic acid having a carboxyl group in each of two carbon atoms forming an α,β-ethylenically unsaturated bond.

7. The cross-linkable nitrile rubber composition as set forth in claim 6, wherein said monoester monomer of dicarboxylic acid is a monoester monomer of dicarboxylic acid having said two carboxyl groups in a trans configuration.

8. The cross-linkable nitrile rubber composition as set forth in claim 3, wherein said silane coupling agent is an epoxy derivative.

9. The cross-linkable nitrile rubber composition as set forth in claim 8, wherein said silane coupling agent is γ-glycidoxypropyltrimethoxysilane.

10. The cross-linkable nitrile rubber composition as set forth in claim 1, wherein said α,β-ethylenically unsaturated dicarboxylic acid monoester monomer unit is at least one monomer unit selected from a group consisting of monopropyl maleate, mono-n-butyl maleate, monopropyl fumarate and mono-n-butyl fumarate.

11. The cross-linkable nitrile rubber composition as set forth in claim 1, wherein said silica (B1) has CaO value determined by X-ray fluorescence composition analysis of 2.3-21.2 wt %.

12. The cross-linkable nitrile rubber composition as set forth in claim 1, wherein a content of said silica (B1) is 40 to 300 parts by weight per 100 parts by weight of said nitrile rubber (A1).

* * * * *